| United States Patent [19] | [11] Patent Number: 4,848,487 |
|---|---|
| Anderson et al. | [45] Date of Patent: Jul. 18, 1989 |

[54] METHOD FOR MINIMIZING MUD SOLIDS INVASION OF CORE SAMPLES OBTAINED DURING SUBSURFACE CORING

[75] Inventors: Maynard L. Anderson, Dallas; Eve S. Sprunt, Farmers Branch; Peggy M. Wilson, Dallas; Susan O. Wooten, Plano, all of Tex.

[73] Assignee: Mobil Oil Corporation, New York, N.Y.

[21] Appl. No.: 213,810

[22] Filed: Jun. 30, 1988

[51] Int. Cl.$^4$ .............................. C09K 7/00; E21B 7/00
[52] U.S. Cl. ........................................ 175/58; 175/65
[58] Field of Search ........................ 175/75, 65, 58, 60; 252/8.51, 8.511, 8.512

[56] References Cited

U.S. PATENT DOCUMENTS

| 3,086,602 | 4/1963 | Henderson | 175/60 X |
|---|---|---|---|
| 3,419,092 | 12/1968 | Elenburg | 175/60 X |
| 3,724,564 | 4/1973 | Messenger | 175/72 |
| 3,724,565 | 4/1973 | Kelly, Jr. | 175/72 |
| 3,876,006 | 4/1975 | Messenger | 166/293 |
| 3,987,855 | 10/1976 | Messenger | 166/294 |
| 4,012,329 | 3/1977 | Hayes et al. | 175/65 X |
| 4,014,394 | 3/1977 | Bailey | 175/72 |
| 4,116,288 | 9/1978 | Love | 175/66 |
| 4,120,369 | 10/1978 | Fischer et al. | 175/72 |
| 4,173,999 | 11/1979 | Messenger | 166/293 |
| 4,247,403 | 1/1981 | Foley et al. | 175/72 X |
| 4,526,240 | 7/1985 | McKinley et al. | 175/72 |
| 4,687,523 | 8/1987 | Hall et al. | 134/30 |

*Primary Examiner*—Stephen J. Novosad
*Attorney, Agent, or Firm*—Alexander J. McKillop; Charles J. Speciale; George W. Hager, Jr.

[57] ABSTRACT

A core sample of an earth formation is obtained by drilling with a coring bit and circulating a coring fluid through the coring bit. The coring fluid contains no mud solids for contaminating the core sample or, in the alternative, contains drilling mud mixed with a bulk material which invades the core sample and occupies the core sample pore spaces preferentially over mud solids. This bulk material is more readily removed from the core sample by cleaning than mud solids.

5 Claims, 1 Drawing Sheet

METHOD FOR MINIMIZING MUD SOLIDS INVASION OF CORE SAMPLES OBTAINED DURING SUBSURFACE CORING

BACKGROUND OF THE INVENTION

This invention relates to the bottom-hole coring of subsurface formations and more particularly to the use of coring fluids containing bulk material for preventing invasion of whole mud solids into core samples taken from such formations.

Samples of earth material are taken from subsurface formations for various purposes. For example, samples are taken to obtain information concerning the chemical or physical characteristics of an earth material, such as permeability, porosity or fluid saturation. In the exploration for and production of oil and gas, samples of earth materials are taken ordinarily by means of a core drill and the samples obtained are in the form of cylinders or cores. Drilling muds with a water or oil base are commonly used as coring fluids. These drilling muds are normally formulated to provide desired density and rheological properties which make them particularly suitable for use in coring wells. For example, drilling muds may be altered to increase the density by adding solid materials, such as barium sulfate, thereto. During the coring of a subsurface formation, contamination of a core sample by the drilling mud can readily occur. The sample material, being porous, will be penetrated by the drilling mud filtrate under the pressure conditions present in the well. Depending on the size of the pore throats in the core material, mud solids (barite, clay minerals and rock cuttings) may also penetrate the core material.

Prior to carrying out porosity or permeability measurements in the laboratory on such a core sample, it is usual practice to clean the core sample of brine, hydrocarbons and mud filtrate. A standard cleaning method is to flush the core sample with liquid toluene and carbon dioxide gas followed by methanol extraction to remove the salt. To remove mud solids various methods have been used, such as ultrasonic cleaning, flooding and waterjet cleaning. In one method described in U.S. Pat. No. 4,687,523 to Hall et al, a dynamic evolution of a dissolved gas previously injected into a core sample in a liquid solution is utilized to carry solid contaminant particles from within the core sample to the outer surface of the core sample. These methods are not very effective in removing solids from deep inside the core sample.

It is, therefore, an object of the present invention to provide a new and improved method for coring subsurface formations in which invasion of whole mud solids into the core samples is minimized or prevented.

SUMMARY OF THE INVENTION

In accordance with the present invention there is provided a method for the bottom-hole coring of a subsurface formation. A wellbore is drilled through the earth to a subsurface formation of interest. A core sample of the earth material in such subsurface formation is obtained by further drilling with a coring bit having a coring barrel into which a core sample is drawn. Circulating through the coring bit during such drilling is a coring fluid selected to minimize dynamic invasion of mud solids into the pore spaces of the core sample as it is being drilled and drawn into the coring bit. In one aspect this coring fluid minimizes such mud solids invasion by being mud solids free. In another aspect, the coring fluid is a drilling mud that minimizes such mud solids invasion by having mixed therein a bulk material which dynamically invades the pore spaces of the core sample as it is being taken and occupies the pore spaces preferentially to the mud solids. This bulk material is thereafter cleaned from the core sample with less degradation to the core sample than the cleaning of mud solids would cause.

Such bulk material may be continuously added to the drilling mud during the entire coring operation or may be added in slug form and timed to pass through the coring bit during the period of time in which the core sample is being drawn into the coring bit. The particle size of the bulk material is selected to correspond to the pore size of the earth material being cored and its composition is such as to permit it to be more readily removed from the core sample by cleaning than mud solids. The bulk material may comprise a plurality of differing particle sizes and such differing particle sizes may even be of differing material composition. The particular type of material may be of any of the numerous lost circulation materials and may further be biodegradable.

DESCRIPTION OF THE PREFERRED EMBODIMENT

Figure 1:
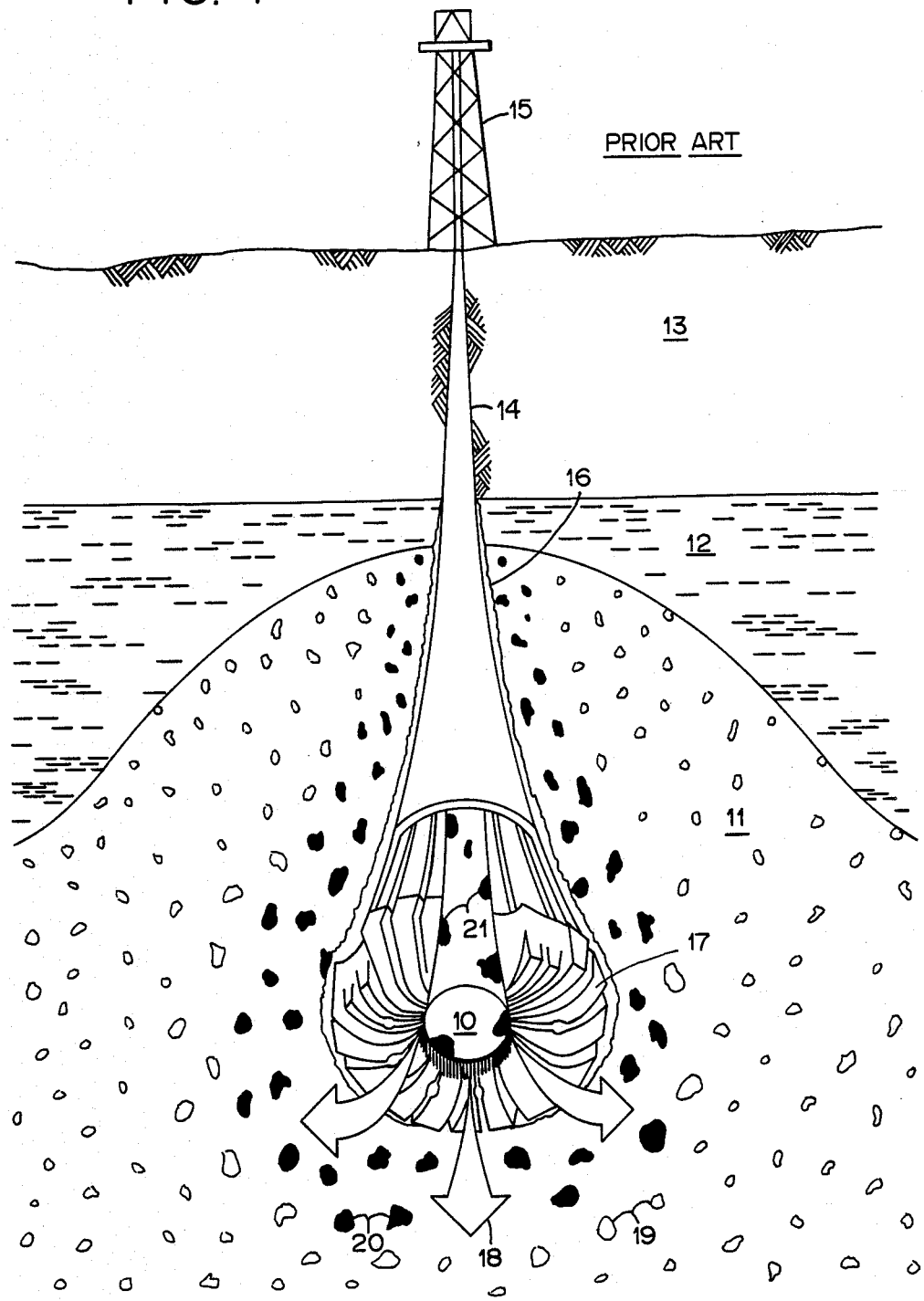
FIG. 1 illustrates in pictorial form a typical prior art subsurface coring operation.

Before describing the method of the present invention relating to the use of coring fluids containing bulk material for preventing invasion of whole mud solids into core samples taken during subsurface coring operations, a coring system which may be used for carrying out the coring operation will first be described in conjunction with FIG. 1.

Referring now to FIG. 1, a typical coring system of the prior art is shown in pictorial form obtaining a core sample 10 from a subsurface formation 11 underlying formations 12 and 13. Drill pipe 14 extends from a surface rig 15 through a wellbore 16 to the subsurface formation of interest 11. By drilling into the formation 11 with a coring bit 17, the solid core 10 of uncut formation enters the inner cylinder or core barrel of the coring bit 17. This solid core 10 is later removed from the core barrel at the earth's surface. For more details as to such a typical bottomhole coring operation reference may be had to *Coring Operations*, by Exploration Logging, Inc., a Baker Drilling Equipment Company, published by International Human Resources Development Corporation, 137 Newbury Street, Boston, Mass., 02116. Another particularly descriptive reference is an article entitled "Coring" in *World Oil*, April 1985, pgs. 83–90.

As seen in FIG. 1, coring fluid flows out of the coring bit 17 as shown by the arrows 18 and as further described in detail in the above mentioned references. This coring fluid penetrates the formation just in front of the coring bit. In certain formations such as vuggy limestones and highly permeable sandstones, such coring fluid penetration can be a problem. A plurality of vugs 19, or pore spaces, in such formations are shown in FIG. 1. As the drilling fluid penetrates the formation directly ahead of the coring bit, those vugs in the near vicinity of the coring bit are filled with the coring fluid as shown by the plurality of filled-in vugs 20. The coring fluid enters the core sample 10 before and as it is being drawn into the coring bit 17. Consequently the core sample is permeated with the coring fluid before any filter cake can form about the core sample. Mud solids in the coring fluid collect in the vugs 21 shown in the core sample 10 due to dynamic filtration through the core sample. Such mud solids occupy pore space that in the petroleum reservoir is occupied by reservoir fluids and, as a foreign solid present in the sample of the reservoir formation, adversely affect all core analysis measurements of the samples. As mentioned above, a common mud solid component in coring fluids is barite which is insoluble in most cleaning solutions. Barite is not easily removed from the occupied pore spaces of the core sample, either chemically or mechanically, by any of the typical cleaning methods mentioned above.

It is therefore a specific aspect of the present invention to provide a coring method in which the unwanted invasion of whole mud solids into core samples of subsurface materials is prevented so that core cleaning procedures that would be degrading to the chemical and physical characteristics of the cored materials will not be required. In accordance within this aspect of the invention, a bulk material is added to the coring fluid which will invade the pore spaces of the formation directly ahead of the coring bit and preferentially occupy the formation pore spaces over the typical mud solids, such as barite, and which will be more readily removed from such pore spaces by cleaning procedures than the typical mud solids. Such bulk material may include any of the known scrap, fibrous, and flake materials which have heretofore been used as lost circulation material in drilling fluids for permeating the more highly permeable zones or fractures of a subsurface formation during conventional well drilling operations and thereby prevent the loss of unacceptably large amounts of whole drilling fluid into the formation. Such use of lost circulation material in drilling fluids is more fully described in U.S. Pat. Nos. 3,724,564; 3,876,006; and 4,173,999 to Messenger and U.S. Pat. No. 3,724,565 to Kelly, Jr. Such patents identify scrap materials such as cottonseed hulls, sawdust and ground walnut shells as being suitable for use as bulk materials for preventing lost circulation of drilling fluids.

In adding a typical lost circulation material to coring fluids to prevent or minimize mud solid loss to the core material in accordance with the present invention, the lost circulation material may also be of a material that is easier to remove from the core material during cleaning than the more common mud solids such as barite. This has not heretofore been of concern when using lost circulation materials in drilling fluids during a drilling operation wherein a core sample is not to be taken. Bulk material that would be particularly suitable would be a biodegradable material that may be reduced in size through chemical or heat treatments of the obtained core sample. Such biodegradable material could be shredded newspaper, partially degraded cotton, or other various organic fibers for examples.

The bulk material may be used with the coring fluid during the entire coring operation. However, one particularly suitable method would be to add a slug of the bulk material to the coring fluid so as to time the passage of the bulk material through the drill bit only during that portion of the core drilling operation during which the core sample is being drawn into the core barrel of the drill bit.

The advantage of adding the bulk material in slug form is that the bulk material is deposited in the pore spaces of the core sample before the core sample encounters any barite or other contaminating mud solids in the coring fluid. The use of a coring fluid completely free of contaminating mud solids would prevent contamination of core samples except by drill cuttings. Therefore the addition of bulk material to the coring fluid may be more preferable than even the use of a mud solids-free coring fluid because the removal of drill cuttings with the same chemical composition as the formation from the core sample pore spaces is difficult without the dissolving or otherwise degrading of the core sample.

The particle size of the bulk material is preferably selected to correspond to the pore size of the earth material of the formation from which the core sample is to be taken so as to preferentially occupy the pore spaces in the core sample over mud solids. The bulk material may be comprised of a plurality of differing particle sizes and material compositions.

The foregoing described preferred embodiment of the present invention permits the obtaining of core samples from subsurface formations that are not degraded by the mud solids invasion that is prevalent in prior art core drilling operations. It is to be understood that various modifications and alterations may be made without departing from the spirit and scope of the invention as set forth in the appended claims.

We claim:
1. A method for the bottom-hole coring of a subsurface formation, comprising the steps of:
 (a) drilling into a subsurface formation through the bottom of a wellbore traversing said formation with a coring bit for obtaining a core sample of the earth material comprising said formation; and
 (b) circulating through said core bit a coring fluid having a bulk material added to a drilling fluid containing mud solids wherein the particle size of said bulk material is selected such that said bulk material dynamically invades said core sample and reduces dynamic invasion of said drilling mud solids into the pore spaces of said core sample as said core sample is being drilled and drawn into said coring bit.

2. The method of claim 1 wherein the particle size of said bulk material is selected to correspond to the pore size of the earth material comprising said core sample.

3. The method of claim 1 wherein said bulk material is of a composition that permits it to be removed from said core sample with less degradation to said core sample than the removal of mud solids.

4. The method of claim 1 wherein said bulk material comprises a plurality of differing particle sizes.

5. The method of claim 4 wherein said differing particle sizes are of differing material composition.

* * * * *